US009659575B2

(12) United States Patent
Takahashi

(10) Patent No.: US 9,659,575 B2
(45) Date of Patent: May 23, 2017

(54) SIGNAL PROCESSOR AND METHOD THEREFOR

(71) Applicant: Oki Electric Industry Co., Ltd., Tokyo (JP)

(72) Inventor: Katsuyuki Takahashi, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 14/770,784

(22) PCT Filed: Nov. 20, 2013

(86) PCT No.: PCT/JP2013/081244
§ 371 (c)(1),
(2) Date: Aug. 26, 2015

(87) PCT Pub. No.: WO2014/132500
PCT Pub. Date: Sep. 4, 2014

(65) Prior Publication Data

US 2016/0005418 A1 Jan. 7, 2016

(30) Foreign Application Priority Data

Feb. 26, 2013 (JP) ................................. 2013-036360

(51) Int. Cl.
*G10L 21/00* (2013.01)
*G10L 21/0232* (2013.01)
(Continued)

(52) U.S. Cl.
CPC ...... *G10L 21/0232* (2013.01); *G10L 21/0264* (2013.01); *G10L 21/0308* (2013.01); *G10L 25/18* (2013.01); *G10L 2021/02166* (2013.01)

(58) Field of Classification Search
CPC .............. H04R 3/005; H04R 2205/022; H04R 2410/01; G10L 2021/02165; G10L 21/0208; G10L 25/78
(Continued)

(56) References Cited

U.S. PATENT DOCUMENTS 5,299,148 A * 3/1994 Gardner ............... H04B 7/0854 342/378
5,848,105 A * 12/1998 Gardner ............ H04L 25/03159 370/478
(Continued)

FOREIGN PATENT DOCUMENTS

JP H06-274195 A 9/1994
JP 2004-289762 A 10/2004
(Continued)

OTHER PUBLICATIONS

Shin'ya Ogata et al., "Iterative Spectral Subtraction Method for Reduction of Musical Noise", Report of the 2001 Spring Meeting, the Acoustical Society of Japan -I-, pp. 387-388, Mar. 2001.
(Continued)

*Primary Examiner* — Michael Colucci
(74) *Attorney, Agent, or Firm* — Rabin & Berdo, P.C.

(57) ABSTRACT

The signal processor suppresses noise components contained in input sound signals by iterative spectral subtraction. The processor derives coherence from first and second directional signals having directivity characteristics on the basis of a pair of input sound signals, and controls the times of iteration of spectral subtraction on the basis of the coherence, thereby suppressing the noise components contained in the input sound signals.

7 Claims, 10 Drawing Sheets

(51) Int. Cl.

*G10L 21/0264* (2013.01)
*G10L 21/0308* (2013.01)
*G10L 25/18* (2013.01)
*G10L 21/0216* (2013.01)

(58) Field of Classification Search

USPC .................. 704/226, 211; 348/175; 367/149; 375/336, 343, 347, 348; 379/417; 381/17, 71.1, 92, 94.1

See application file for complete search history.

(56) References Cited

U.S. PATENT DOCUMENTS

| | | | | |
|---|---|---|---|---|
| 7,453,961 | B1 * | 11/2008 | Li | G01C 21/206 342/357.61 |
| 8,340,234 | B1 * | 12/2012 | Cheng | H04L 25/0212 375/348 |
| 8,682,006 | B1 * | 3/2014 | Laroche | G10L 21/0208 381/71.1 |
| 9,031,257 | B2 * | 5/2015 | Sorensen | H04R 3/005 381/122 |
| 2003/0043696 | A1 * | 3/2003 | Vakoc | G01H 9/00 367/149 |
| 2003/0112967 | A1 * | 6/2003 | Hausman | H04B 3/23 379/417 |
| 2004/0018028 | A1 * | 1/2004 | Chiba | G03G 21/0064 399/149 |
| 2005/0105657 | A1 * | 5/2005 | Kroeger | H04B 7/0805 375/347 |
| 2007/0005350 | A1 * | 1/2007 | Amada | G01C 21/206 704/211 |
| 2010/0150375 | A1 * | 6/2010 | Buck | G10L 25/78 381/94.1 |
| 2010/0254541 | A1 * | 10/2010 | Hayakawa | G10L 21/0208 381/71.1 |
| 2012/0121092 | A1 * | 5/2012 | Starobin | H04R 5/02 381/17 |
| 2012/0182429 | A1 * | 7/2012 | Forutanpour | H04R 3/005 348/175 |
| 2013/0066628 | A1 * | 3/2013 | Takahashi | H04R 3/005 704/226 |
| 2014/0219666 | A1 * | 8/2014 | Tselniker | H04L 25/03019 398/208 |

FOREIGN PATENT DOCUMENTS

| | | | |
|---|---|---|---|
| JP | 2007-010897 | A | 1/2007 |
| JP | 2008-070878 | A | 3/2008 |
| JP | 2010-286685 | A | 12/2010 |
| JP | 2011-248290 | A | 12/2011 |

OTHER PUBLICATIONS

Kotaro Nishikawa et al., “Hanpuku Spectral Subtraction ni Okeru Musical Noise Teigenho no Kento”, Report of the 2009 Autumn Meeting, the Acoustical Society of Japan, pp. 149-150, Sep. 2009.

International Search Report dated Feb. 25, 2014.

* cited by examiner

33

| COHERENCE COH | ITERATION COUNT Θ |
|---|---|
| | |
| A∼B | α |
| B∼C | β |
| C∼D | γ |
| | |

COHERENCE COH: SMALLER ↕ LARGER

ITERATION COUNT Θ: LARGER ↕ SMALLER

SIGNAL PROCESSOR AND METHOD THEREFOR

TECHNICAL FIELD

The present invention relates to a signal processor and a method therefor, and more particularly to a telecommunications device and a telecommunications method handling voice signals including acoustic signals on telephone sets, videoconference devices or equivalent.

BACKGROUND ART

As one of solutions for suppressing a noise component included in a captured voice signal, there is the spectral subtraction method. That is also called the frequency subtraction method, which subtracts a noise spectrum from the spectrum of a voice signal containing noise.

However, the spectral subtraction is effective at suppressing a noise component, but may cause an allophone component, i.e. musical noise, a sort of tonal noise.

Shinya OGATA, et al., "Iterative Spectral Subtraction Method for Reduction of Musical Noise", Proceedings of the Meeting of the Acoustical Society of Japan, pages 387-388, March 2001, discloses that a signal, whose noise component is suppressed by spectral subtraction, is subjected again to the spectral subtraction in such a manner that an iteration process is repeated a certain number of times, e.g. ten, to suppress the generated noise including musical noise.

According to the conventional iterative spectral subtraction, particularly when directivity is formed to estimate noise, an estimated noise component may be subtracted excessively. If the arrival bearing of voice of someone other than a target speaker, namely disturbing sound, corresponds to a direction according to the formed directivity, the precision of the estimated noise is so high that a single subtraction can produce significant suppression effect. In such a case, if the times of iteration are fixed, the subtraction may be performed more than necessary because of too many iterations although fewer times of iteration suffice, whereby a target vocal component may also be suppressed, causing sound distortion.

By contrast, if the arrival bearing of a disturbing sound is off the direction according to the formulated directivity, the precision of the estimated noise component is so low that the suppression effect brought by the single subtraction is small, and it is therefore preferable to conduct the iteration a larger number of times. However, if the times of iteration are fixed, actual times of iteration will be fewer than a required number of times, and as a consequence the capability to suppress the noise component will be insufficient although the target voice is less affected.

In this way, the iterative spectral subtraction method has the drawbacks that the vocal component may become distorted and loses its naturalness each time the iteration is repeated, and that the optimal times of iteration may vary depending on the arrival bearing of disturbing sound.

SUMMARY OF THE INVENTION

It is an object of the present invention to provide a signal processor and a method therefor, which can suppress a noise component according to an iterative spectral subtraction method, and achieve a good balance between the naturalness of sound quality and the capability of suppressing noise including musical noise.

A signal processor in accordance with the present invention comprises an iterative spectral subtractor for repeatedly performing spectral subtraction on an input signal containing a noise component so that the spectral subtraction is iterated to suppress the noise component, and also comprises a feature quantity calculator for calculating from the input signal a content of a target signal as a feature quantity, and an iteration count control for controlling, on the basis of the feature quantity, the times of iteration of the spectral subtraction.

In accordance with the present invention, the signal processing method comprises an iterative spectral subtraction step of repeatedly performing spectral subtraction on an input signal containing a noise component so that the spectral subtraction is iterated to suppress the noise component, and also comprises a feature quantity calculation step of calculating from the input signal a content of a target signal as a feature quantity, and an iteration count controlling step of controlling, on the basis of the feature quantity, the times of iteration of the spectral subtraction.

The present invention can also be implemented as a computer program enabling a computer to serve as the above-mentioned signal processor.

In this way, the present invention can provide a signal processor and a method therefor, which can suppress a noise component according to an iterative spectral subtraction method, and achieve a good balance between the naturalness of sound quality and the capability of suppressing noise including musical noise.

BRIEF DESCRIPTION OF THE DRAWINGS

The objects and features of the present invention will become more apparent from consideration of the following detailed description taken in conjunction with the accompanying drawings in which.

BEST MODE FOR IMPLEMENTING THE INVENTION

With reference to the accompanying drawings, a description will be made about a signal processor according to a first embodiment of the present invention for adaptively controlling an iteration to iteratively conduct spectral subtraction.

The signal processor of the first embodiment controls the times of iteration for conducting the iterative spectral subtraction depending on the arrival bearing of a disturbing sound, so as to accomplish both of the naturalness of a voice sound and noise suppression capability.

Figure 1:
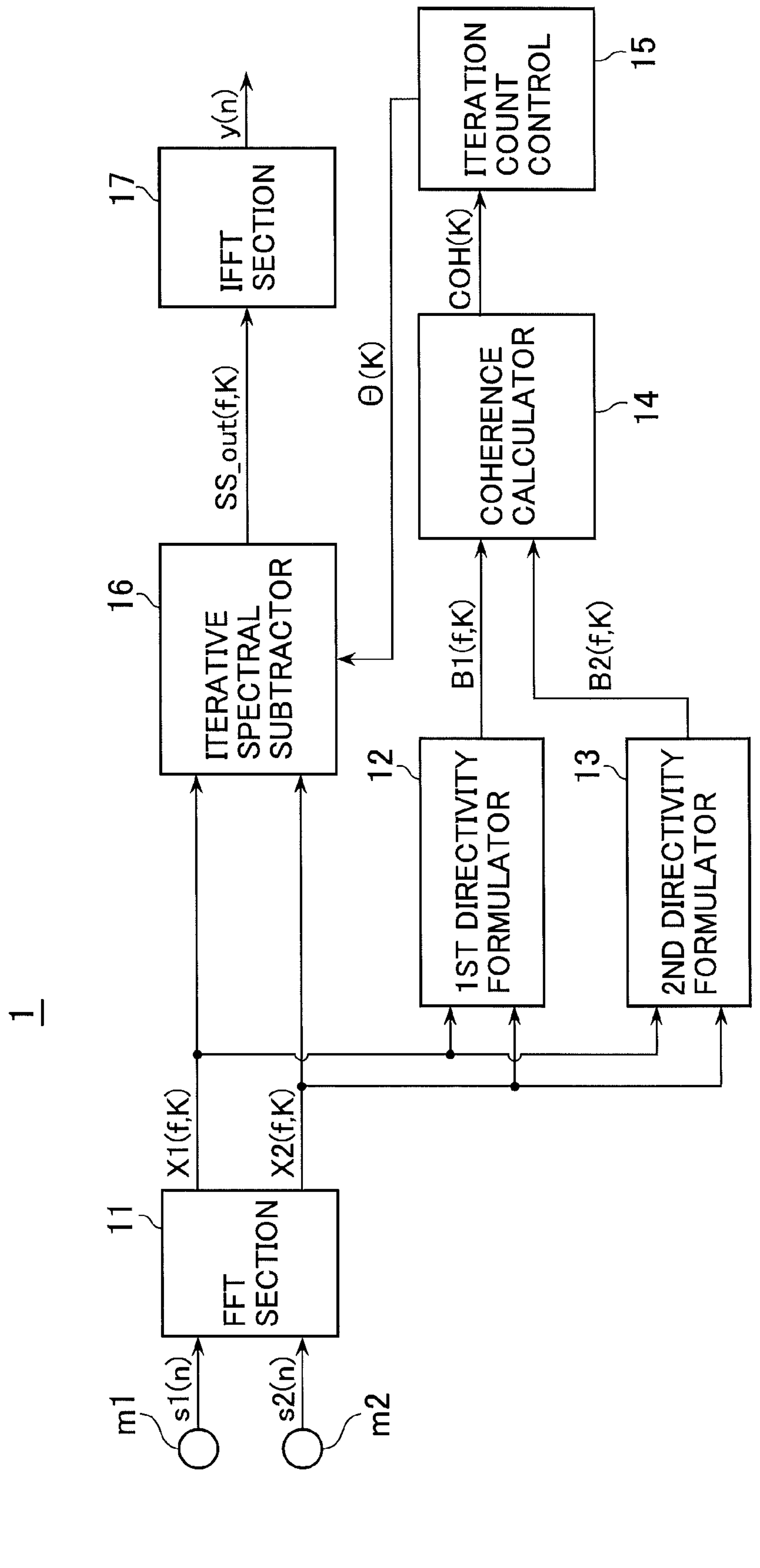
FIG. 1 is a schematic block diagram showing a configuration of a signal processor according to an embodiment of the present invention.

FIG. 1 shows in function the illustrative embodiment of the signal processor, which may be implemented in the form of hardware. Alternatively, the components, other than a pair of microphones m1 and m2, can be implemented by software, such as signal processing program sequences, which run on a central processing unit (CPU) included in a processor system such as a computer. In this case, functional components as illustrated in the form of blocks in the figures as if they were implemented in the form of circuitry or devices, may actually be program sequences run on a CPU. Such program sequences may be stored in a storage medium and read into a computer so as to run thereon.

As shown in FIG. 1, a signal processor 1 includes a pair of microphones m1 and m2, a fast Fourier transform (FFT) section 11, a first and a second directivity formulator 12 and 13, a coherence calculator 14, an iteration count control 15, an iterative spectral subtractor 16 and an inverse fast Fourier transform (IFFT) section 17.

The pair of microphones m1 and m2 is disposed with a predetermined or given spacing between them to pick up voices around respective microphones. Voice signals, or input signals, picked up by the microphones m1 and m2 are converted by a corresponding analog-to-digital (AD) converter, not shown, into digital signals s1($n$) and s2($n$) and in turn sent to the FFT section 11. In the illustrative embodiment, n is an index indicative of the order of inputting samples in time serial, and is represented with a positive integer. In this context, a smaller value of n means an older input sample while a larger value of n means a newer input sample.

The FFT section 11 is configured to receive the series of input signals s1($n$) and s2($n$) to perform fast Fourier transform, or discrete Fourier transform, on the input signal s1 and s2. Thus, the input signals s1 and s2 can be represented in the frequency domain. When the fast Fourier transform is conducted, the input signals s1($n$) and s2($n$) are used to set analysis frames FRAME1(K) and FRAME2(K), which are composed of a predetermined N number of samples. The following Expression (1) presents an example for setting the analysis frame FRAME1(K) from the input signal s1($n$), which expression is also applicable to set the analysis frame FRAME2(K). In Expression (1), N is the number of samples and is a positive integer:

$$\text{FRAME }1(1) = \{s1(1), s1(2), \ldots, s1(i), \ldots, s1(N)\} \quad (1)$$

$$\vdots$$

$$\text{FRAME }1(K) = \{s1(N\times K+1), s1(N\times K+2), \ldots, s1(N\times K+i), \ldots, s1(N\times K+N)\}$$

Note that K in Expression (1) is an index denoting the frame order which is presented with a positive integer. In this context, a smaller value of K means an older analysis frame while a larger value of K means a newer analysis frame. In addition, an index denoting the latest analysis frame to be analyzed is K unless otherwise specified in the following description.

The FFT section 11 carries out the fast Fourier transform on the input signals for each analysis frame to convert the signals into frequency domain signals X1($f$,K) and X2($f$,K), thereby supplying the obtained frequency domain signals X1($f$,K) and X2($f$,K) to the iterative coherence filter processor 12.

Note that f is an index representing a frequency. In addition, X1($f$,K) is not a single value, but is formed of spectrum components with several frequencies f1 to fm, as represented by the following Expression (2). Moreover, X1($f$,K) is a complex number consisting of a real part and an imaginary part. The same is true of X2($f$,K) as well as B1($f$,K) and B2($f$,K), which will be described later.

$$X1(f,K)=\{X1(f1,K),X1(f2,K), \ldots ,X1(fm,K)\} \quad (2)$$

The iterative spectral subtractor 16 is adapted to perform the spectral subtraction a certain number of times θ(k) assigned by the iteration count control 15 to derive a signal SS_out(f,K), from which a noise component is suppressed, and supplies the obtained signal to the IFFT section 17.

The IFFT section 17 is configured to perform inverse fast Fourier transform on the noise-suppressed signal SS_out(f, K) to acquire an output signal y(n), which is a time domain signal.

As shown in FIG. 1, the signal processor 1 has the first and second directivity formulator 12 and 13, the coherence calculator 14 and the iteration count control 15, and the iterative spectral subtractor 16, the iteration count control supplying the iterative spectral subtractor 16 with information about the times of iteration θ(k). As described above, the signal processor 1 of the illustrative embodiment controls the times of iteration of the iterative spectral subtraction depending on the arrival bearing of a disturbing sound to thereby accomplish both of the naturalness of the voice sound and the noise suppression capability, and the coherence is utilized as the feature quantity in which the arrival bearing of the disturbing sound is reflected.

Figure 2A:
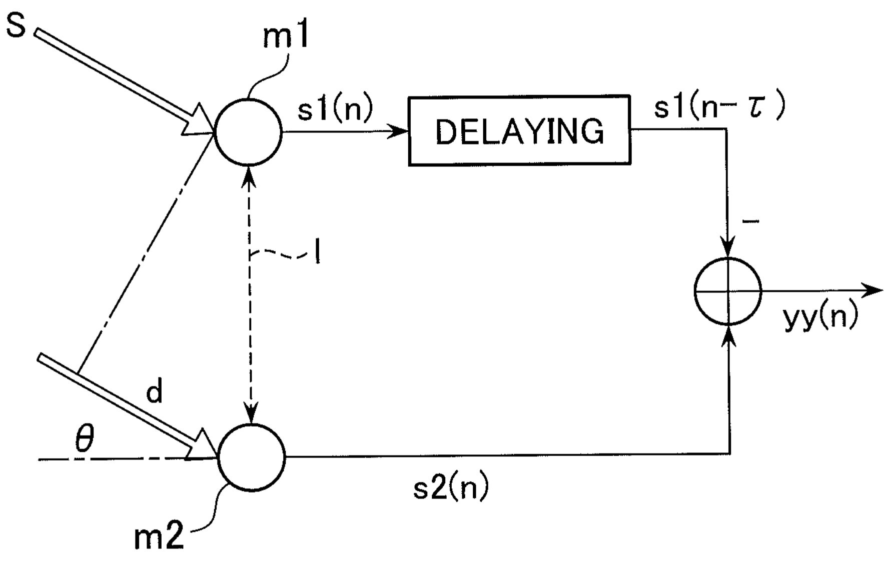
FIGS. 2A and 2B are diagrams for illustrating characteristics of a directional signal transmitted from a first and a second directivity formulator according to the embodiment shown in FIG. 1.

The first directivity formulator 12 is adapted to use the frequency domain signals X1($f$,K) and X2($f$,K) to form a signal B1($f$,K) having higher directivity in a specific direction with respect to a sound source direction (S, FIG. 2A). The second directivity formulator 13 is also adapted to use the frequency domain signals X1($f$,K) and X2($f$,K) to form a signal B2($f$,K) having higher directivity in another specific direction with respect to the sound source direction. The signals B1($f$,K) and B2($f$,K), having the higher directivity in their respective, specific directions, can be formed by applying a known method. For instance, a method using the following Expression (3) may be applied to form the signal B1($f$,K) being null in the right direction, and Expression (4) may be applied to form the signal B2($f$,K) being null in the left direction. In Expressions (3) and (4), the frame index K is omitted because it is not related to the calculation:

$$B1(f) = X2(f) - X1(f) \times \exp\left[-\frac{i2\pi fS}{N}\tau\right] \quad (3)$$

$$B2(f) = X1(f) - X2(f) \times \exp\left[-\frac{i2\pi fS}{N}\tau\right] \quad (4)$$

where S is a sampling frequency, N is the length of an FFT analysis frame, τ is an arrival time difference of a sound wave between the microphones, i is an imaginary unit, and f is a frequency.

Figure 2B:
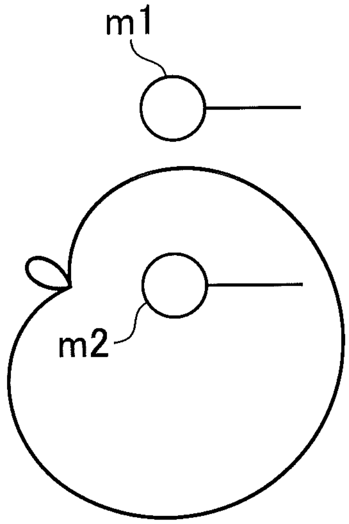

Now, with reference to FIGS. 2 and 3, the above expressions will be described, taking Expression (3) as an example. A sound wave comes from the direction θ shown in FIG. 2A and is captured by the pair of microphones m1 and m2 disposed with a distance l between them. At this time, there is a difference in time in the arrival of the sound wave at microphones m1 and m2. When a difference in sound path is indicated by d, the difference can be expressed by an equation d=l×sin θ, and thus if a sound propagation speed is c, the arrival time difference τ can be given by the following Expression (5):

$$\tau = l \times \sin\theta / c \qquad \text{Expression (5)}$$

Now, if the input signal s1(*n*) is given a value of delay τ to obtain a signal s1(*t*−τ), the obtained signal is equivalent to an input signal s2(*t*). Thus, a signal y(n)=s2(*t*)−s1(*t*−τ) derived by eliminating the difference between those signals is a signal in which sound coming from the direction θ is eliminated. Consequently, the microphone array m1 and m2 will have directional characteristics shown in FIG. 2B.

Figure 3A:
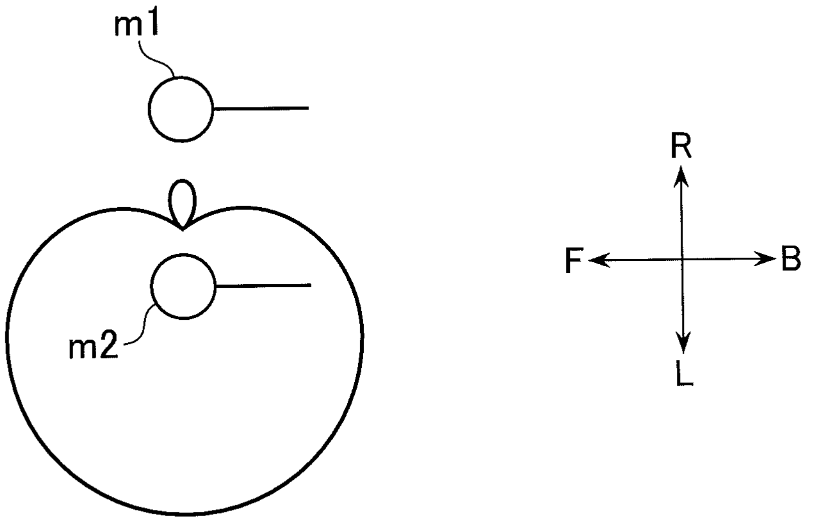
FIGS. 3A and 3B are diagrams for illustrating the directional signal generated by the first and second directivity formulators according to the embodiment shown in FIG. 1.
Figure 3B:
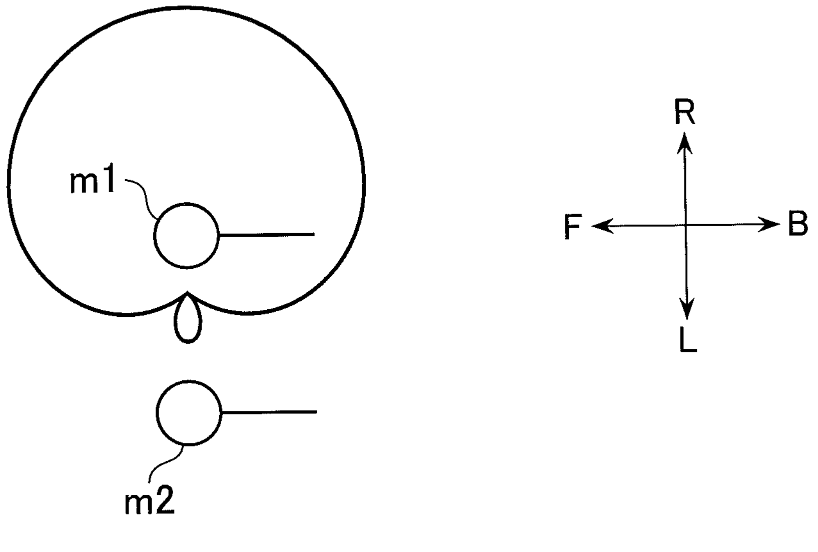

Note that, in the illustrative embodiment, the calculation is made in the time domain. In this regard, a calculation in the frequency domain can also provide the same effect, in which case the aforementioned Expressions (3) and (4) are applied. Assume that an arrival bearing θ is ±90 degrees. More specifically, a directional signal b1(*f*) supplied from the first directivity formulator 12 has higher directivity in a right direction (R) as shown in FIG. 3A whereas the other directional signal B2(*f*) supplied from the second directivity formulator 13 has higher directivity in a left direction (L) as shown in FIG. 3B. In these figures, F denotes forward, and B denotes backward. From now on, a description will be made on premises that θ is ±90 degrees, but may not be restricted thereto.

The coherence calculator 14 is configured to make calculation on the directional signals B1(*f*,K) and B2(*f*,K) obtained as above by applying Expressions (6) and (7), so as to acquire a coherence value COH(K). In Expression (6), B2(*f*)* is a conjugate complex number of B2(*f*). Furthermore, the frame index K is omitted from Expressions (6) and (7) because it is not related to the calculation.

$$coef(f) = \frac{|B1(f) \cdot B2(f)^*|}{\frac{1}{2}\{|B1(f)|^2 + |B2(f)|^2\}} \quad (6)$$

$$COH = \sum_{f=0}^{M-1} coef(f)/M \quad (7)$$

Now, a brief description will be made on why the magnitude of coherence value can be utilized for determining whether or not an input signal, namely target voice or disturbing sound, comes from the front.

The concept of coherence can be translated into a correlation between a signal coming from right and a signal coming from left. In this connection, Expression (6) is directed to calculating the correlation of a certain frequency component, and Expression (7) is directed to calculating the average of the correlation values of all frequency components. Thus, smaller coherence value COH means that the correlation between two directional signals B1 and B2 is smaller whereas larger coherence value COH means that the correlation is larger. When the correlation is smaller, the arrival bearing of the input signal deviates significantly in the right or left direction, which means the signal comes from a direction other than the front direction. By contrast, when the coherence value COH is larger, there is no deviation in the arrival bearing, which means the input signal comes from the front direction. In this way, the magnitude of the coherence value can be used to determine whether or not the arrival bearing of the input signal is the front direction.

Figure 4:
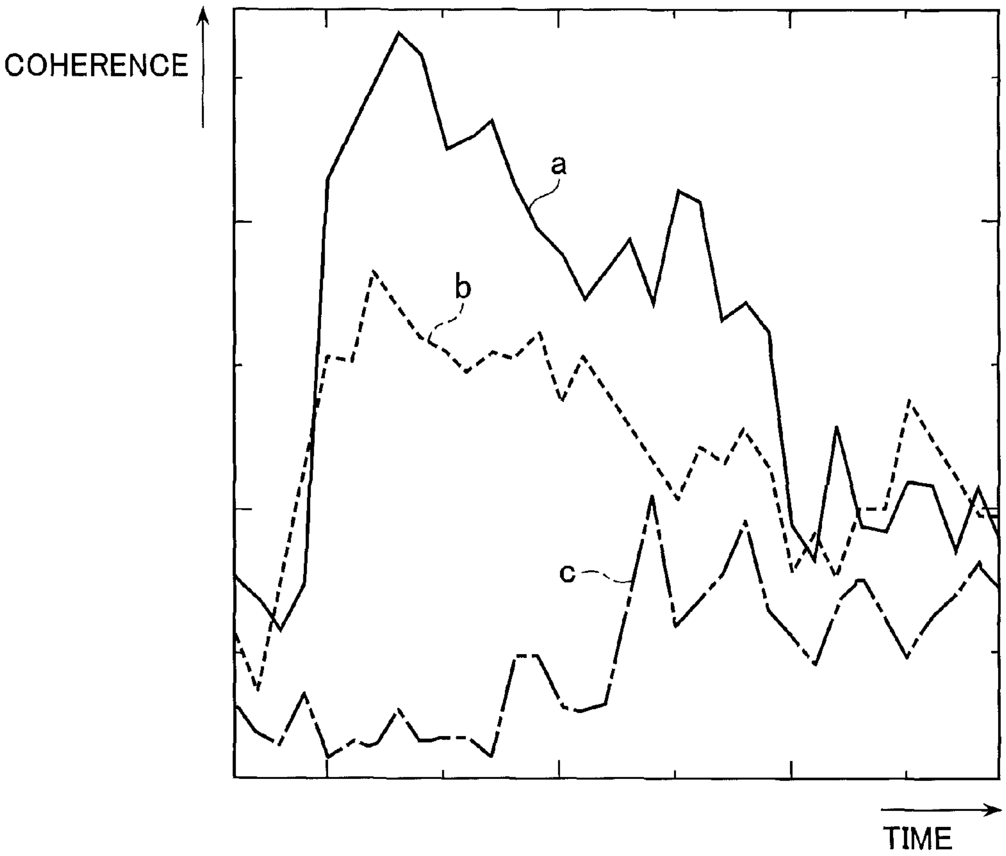
FIG. 4 illustrates the behavior of coherence with respect to arrival bearing.

It is clear from FIG. 4 that the values of the coherence change within respectively different ranges, depending upon the arrival bearings, such as the front a, the side c, and in between b. By utilizing the above characteristics, the arrival bearing of a disturbing sound is estimated, and on the basis of the result of this estimation, the times of iteration of the iterative spectral subtraction are controlled.

The iteration count control 15 is adapted to derive the times of iteration θ(K) defined according to which one of the ranges the coherence value COH(K) calculated by the coherence calculator 14 resides, and supply the derived information to the iterative spectral subtractor 16.

Figure 5:
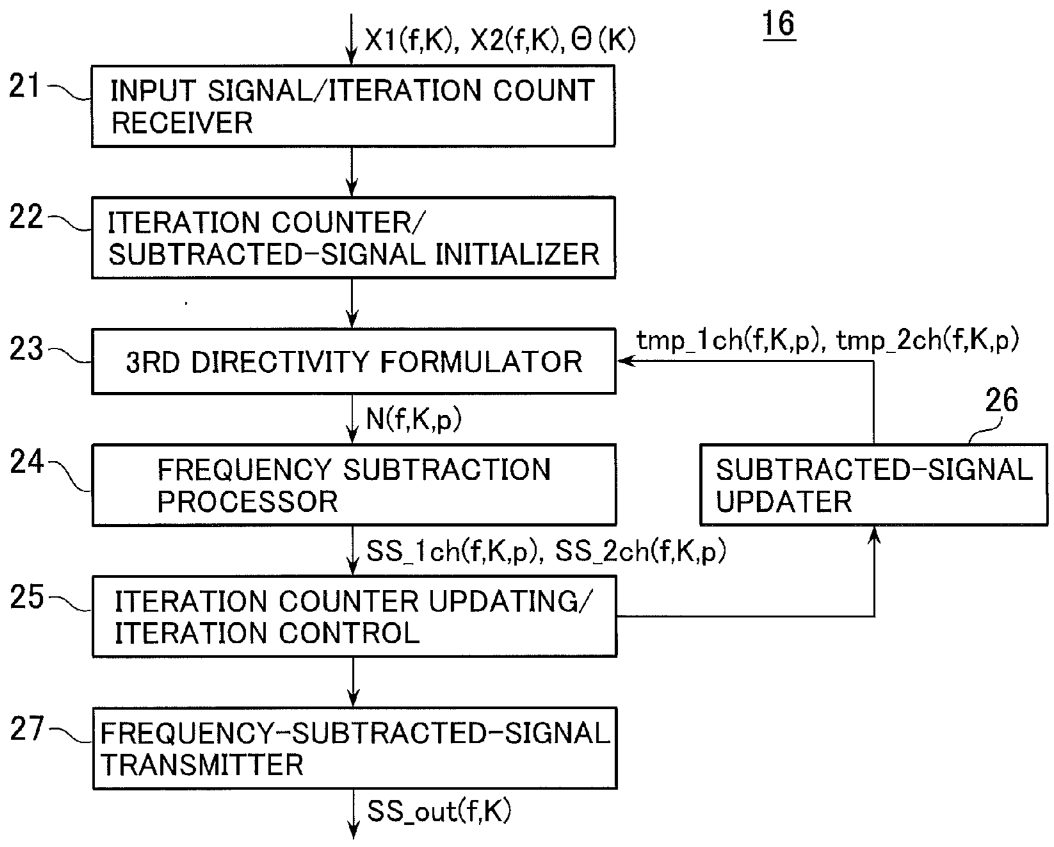
FIG. 5 is a schematic block diagram showing in detail a configuration of an iterative spectral subtractor according to the embodiment shown in FIG. 1.

FIG. 5 shows an example of the iterative spectral subtractor 16, which is configured to iterate the spectral subtraction a prescribed number of times θ(K) given by the iteration count control 15. As a matter of course, any conventional configurations may be employed, such as conventional methods for executing the spectral subtraction, for iterating the subtraction and so forth.

In FIG. 5, the iterative spectral subtractor 16 includes an input signal/iteration count receiver 21, an iteration counter/subtracted-signal initializer 22, a third directivity formulator 23, a spectral subtraction processor 24, an iteration counter updating/iteration control 25, a subtracted-signal updater 26 and a spectral-subtracted-signal transmitter 27.

Figure 9:
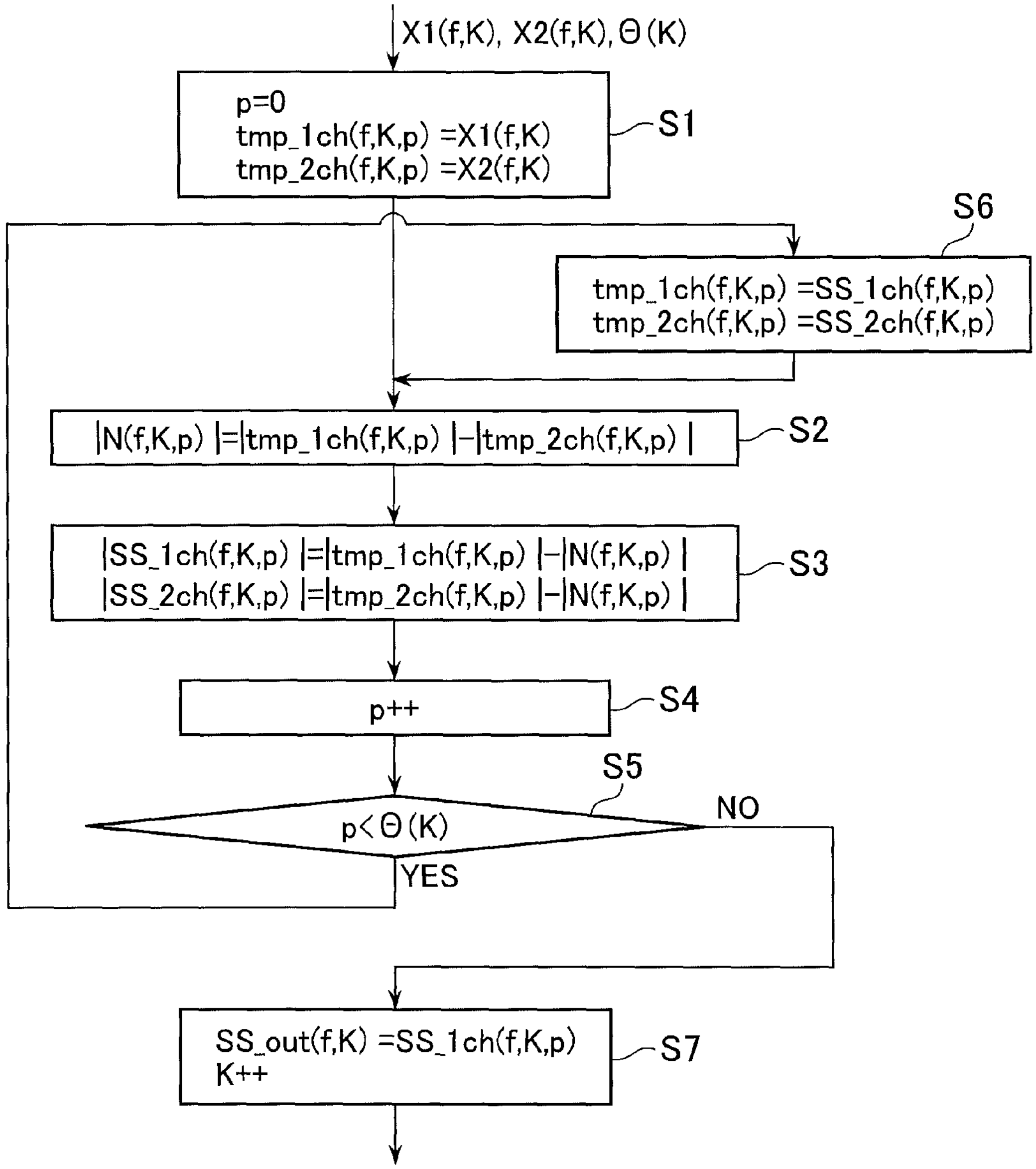
FIG. 9 is a flowchart useful for understanding a specific operation of the iterative spectral subtractor in the embodiment.

In the iterative spectral subtractor 16, the above components 21 to 27 work together to carry out the processing shown in the flowchart of FIG. 9, which will be described later.

The input signal/iteration count receiver 21 receives the frequency domain signals X1(*f*,K) and X2(*f*,K) output from the FFT section 11 and the times of iteration θ(K) output from the iteration count control 15.

The iteration counter/subtracted-signal initializer 22 resets a counter variable p indicative of the times of iteration (hereinafter referred to as iteration counter) as well as signals to be subtracted tmp_1ch(f,K,p) and tmp_2ch(f,K,p), from which noise is subtracted by the spectral subtraction. An initial value of the iteration counter p is 0 (zero), and initial values of the signals to be subtracted tmp_1ch(f,K,p) and tmp_2ch(f,K,p) are X1(*f*,K) and X2(*f*,K), respectively.

The third directivity formulator 23 uses the signals to be subtracted tmp_1ch(f,K,p) and tmp_2ch(f,K,p) derived by the subtraction conducted the times of iteration currently defined to form a noise signal N(f,K,p), or a third directional signal, according to the following Expression (8):

$$|N(f,K,p)|==|tmp\_1ch(f,K,p)|-|tmp\_2ch(f,K,p)| \quad (8)$$

Figure 6:
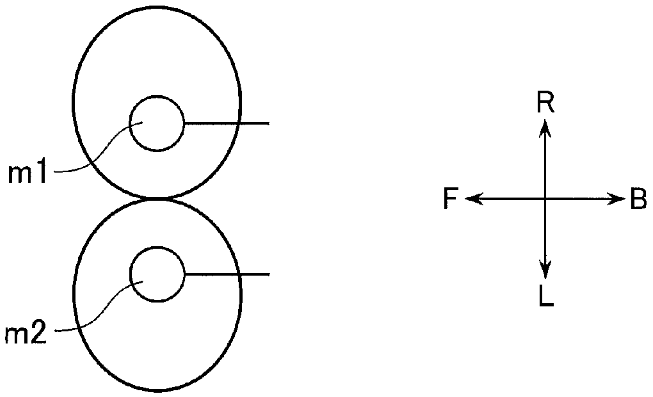
FIG. 6 is a diagram for illustrating the directivity of an output signal generated by a third directivity formulator of the iterative spectral subtractor in the embodiment.

The noise signal N(f,K,p) changes depending on the times of iteration. As can be understood from the fact that the initial values of the signals to be subtracted tmp_1ch(f,K,p) and tmp_2ch(f,K,p) are X1(*f*,K) and X2(*f*,K), respectively, and the noise signal N(f,K,p) is formed by using a difference in absolute values between the signals to be subtracted, the noise signal N(f,K,p) has a directivity shown in FIG. 6. That is to say, the noise signal N(f,K,p) has a directivity that is null in the front direction.

The spectral subtraction processor 24 uses the signals to be subtracted tmp_1ch(f,K,p) and tmp_2ch(f,K,p) derived by the subtraction conducted the times of iteration currently defined as well as the noise signal N(f,K,p) to iteratively carry out the spectral subtraction the currently-defined number of times according to the following Expressions (9) and (10), thereby forming spectral-subtracted signals SS_1ch(f,K,p) and SS_2ch(f,K,p):

$$|SS\_1ch(f,K,p)|=|tmp\_1ch(f,K,p)|-|N(f,K,p)| \quad (9)$$

$$|SS\_2ch(f,K,p)|=|tmp\_2ch(f,K,p)|-|N(f,K,p)| \quad (10)$$

The iteration counter updating/iteration control 25 increments the iteration counter p by one when the spectral subtraction in the current iteration is terminated, and in turn determines whether or not the iteration counter p reaches the times of iteration θ(K) output from the iteration count control 15. If the counter p does not reach the times of iteration θ(K), the iteration counter updating/iteration control 25 then controls the components to continue the iteration of the spectral subtraction, and if the counter p reaches the number, the control 25 controls those components to terminate the iteration of the spectral subtraction.

When the iteration of the spectral subtraction is continued, the subtracted-signal updater 26 updates the signals to be subtracted tmp_1ch(f,K,p) and tmp_2ch(f,K,p) with the spectral-subtracted signals SS_1ch(f,K,p−1) and SS_2ch(f,K,p−1) acquired in the last iteration.

The spectral-subtracted-signal transmitter 27 supplies, when the iteration of the spectral subtraction is terminated, the IFFT section 17 with one of the spectral-subtracted signals SS_1ch(f,K,p−1) and SS_2ch(f,K,p−1) obtained at that time point in the form of iterative spectral-subtracted signal SS_out(f,K). In addition, the spectral-subtracted-signal transmitter 27 increments by one a variable K which defines a frame, and starts processing on the next frame.

Figures 7, 8:
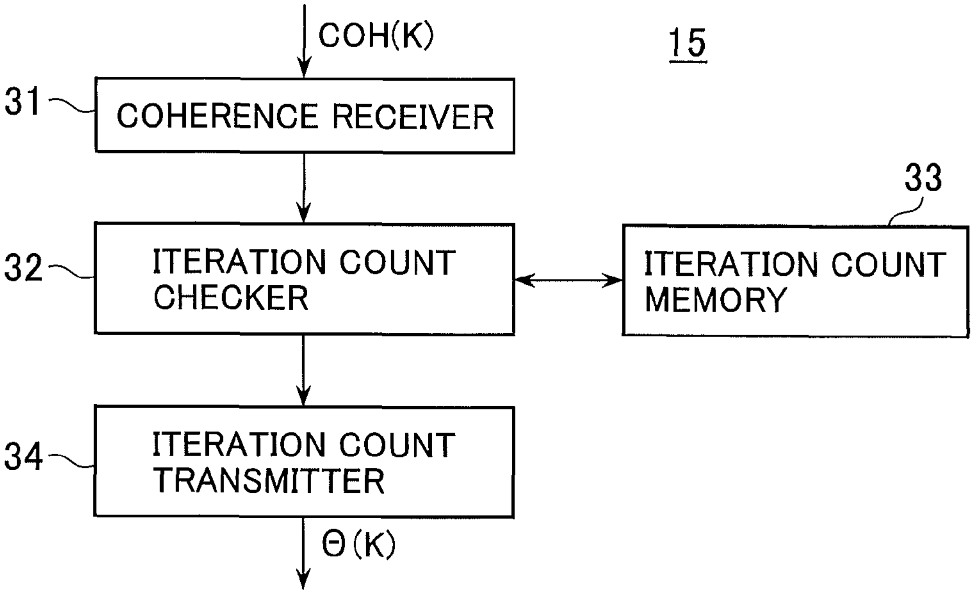
FIG. 7 is a schematic block diagram showing in detail a configuration of an iteration count control according to the embodiment.
FIG. 8 illustrates memory contents stored in an iteration count memory of the iteration count control in the embodiment.

In FIG. 7, the iteration count control 15 includes a coherence receiver 31, an iteration count checker 32, an iteration count memory 33 and an iteration count transmitter 34.

The coherence receiver 31 retrieves the coherence value COH(K) output from the coherence calculator 14.

The iteration count checker 32 utilizes the coherence value COH(K) as a key to draw out the times of iteration θ(K) of the iterative spectral subtraction from the iteration count memory 33.

The iteration count memory 33 stores, as shown in FIG. 8, the times of iteration θ(K) in association with the ranges of the coherence value COH. FIG. 8 illustrates an example in which the coherence value COH larger than A and not exceeding B is associated with the times of iteration α, the coherence value COH larger than B and not exceeding C is associated with the times of iteration β(β<α), and the coherence value COH larger than C and not exceeding D is associated with the times of iteration γ (γ<β).

The iteration count transmitter 34 supplies the number of iteration θ(K) acquired by the iteration count checker 32 to the iterative spectral subtractor 16.

Next, with reference to the drawings, the general operation of the signal processor 1 of the first embodiment and a specific operation of the iterative spectral subtractor 16 will be described.

The signals s1(*n*) and s2(*n*) in the time domain input by the pair of microphones m1 and m2 are transformed respectively into the signals X1(*f*,K) and X2(*f*,K) in the frequency domain by the FFT section 11, which are then supplied to the first and second directivity formulators 12 and 13 and the iterative spectral subtractor 16.

On the basis of the signals X1(*f*,K) and X2(*f*,K) in the frequency domain, the first and second directivity formulator 12 and 13 respectively form the first and second directional signals B1(*f*,K) and B2(*f*,K), which are null in certain respective directions. The coherence calculator 14 in turn employs the first and second directional signals B1(*f*,K) and B2(*f*,K) to perform the calculation according to Expressions (6) and (7) so as to calculate the coherence value COH(K), and subsequently the iteration count control 15 acquires the times of iteration θ(K) corresponding to a range where the calculated coherence value COH(K) resides to supply the times of iteration to the iterative spectral subtractor 16.

The iterative spectral subtractor 16 uses the frequency domain signals X1(*f*,K) and X2(*f*,K) as initial signals to be subtracted to conduct the iteration of the spectral subtraction the predetermined number of times θ(K), and supplies the iterative spectral-subtracted signal SS_out(f,K) thus obtained to the IFFT section 17.

The IFFT section 17 carries out the inverse fast Fourier transform on the iterative spectral-subtracted signal SS_out(f,K) in the frequency domain to transform the signal into the time domain signal y(n), and outputs the obtained time domain signal y(n).

Next, with reference to FIG. 9, the specific operation of the iterative spectral subtractor 16 will be described. FIG. 9 shows the processing conducted on a frame, the processing shown in FIG. 9 being repeated frame by frame.

When the processing is conducted on a new frame and the frequency domain signals X1(*f*,K) and X2(*f*,K) of the new frame, i.e. current frame K, are supplied from the FFT section 11, the iteration counter p is reset to zero while the signals to be subtracted tmp_1ch(f,K,p) and tmp_2ch(f,K,p) are initialized to the frequency signals X1(*f*,K) and X2(*f*,K), respectively (Step S1).

Then, on the basis of the signals to be subtracted tmp_1ch(f,K,p) and tmp_2ch(f,K,p) obtained by performing the iteration the number of times currently defined, the noise signal N(f,K,p) is formed according to Expression (8) (Step S2).

In addition, on the basis of the signals to be subtracted tmp_1ch(f,K,p) and tmp_2ch(f,K,p) obtained by the current iteration as well as the noise signal N(f,K,p), the spectral subtraction is iterated the currently-defined number of times according to Expressions (9) and (10) to thereby form the spectral-subtracted signals SS_1ch(f,K,p) and SS_2ch(f,K,p) (Step S3).

Subsequently, the iteration counter p is incremented by one (Step S4), and then a determination is made on whether or not the updated iteration counter p is smaller than the times of iteration θ(K) output from the iteration count control 15 (Step S5).

If the updated iteration counter p is smaller than the times of iteration θ(K), the signals to be subtracted tmp_1ch(f,K,p) and tmp_2ch(f,K,p) are respectively updated with the spectral-subtracted signals SS_1ch(f,K,p) and SS_2ch(f,K,p) acquired by the last iteration (Step S6), and the operation goes to the aforementioned Step 2.

By contrast, if the updated iteration counter p is greater than the times of iteration θ(K), one of the spectral-subtracted signals SS_1ch(f,K,p) and SS_2ch(f,K,p) obtained at the time is supplied to the IFFT section 17 in the form of iterative spectral-subtracted signal SS_out(f,K), and the parameter K defining a frame is incremented by one (Step S7), and then the processing will be executed on the next frame.

According to the first embodiment, the times of iteration of the iterative spectral subtraction are adaptively defined depending on the arrival bearing of the disturbing sound so as to carry out the iterative spectral subtraction the defined times of iteration, thereby accomplishing a good balance between the sound quality and the suppression capability.

In this way, the signal processor of the first embodiment can be applied to a telecommunications device, such as a videoconference system, cellular phone, smartphone and similar, to improve the sound quality on telephonic speech.

Next, with reference to the drawings, a detailed description will be made on a signal processor and a signal processing method in accordance with a second embodiment of the present invention.

The signal processor and the signal processing method of the second embodiment are also featured in that the times of iteration for repeatedly performing the spectral subtraction are adaptively controlled, but have the behavior of a parameter for use in the control differing from that of the first embodiment.

Conventionally, the number of times in iterating the spectral subtraction is fixed. However, the optimal times of iteration change depending on the characteristics of noise. Hence, when the times of iteration are fixed, the degree of noise suppression may be insufficient, and moreover there is a possibility of impairing the naturalness due to the distortion of the sound occurring each time the iteration is carried out, so that it would be disadvantageous to unnecessarily increase the times of iteration. The second embodiment intends to define the optimal times of iteration that can achieve a good balance between the natural sound quality having less distortion and musical noise and the suppression capability.

In the second embodiment, the behavior of the coherence value COH(K,p) is utilized to make a determination about the termination of the iteration, and the reason for utilizing the coherence will be described below.

Since a coherence filter coefficient coef(f,K,p) to be used for calculating the coherence value COH(K,p) by means of averaging as defined by Expression (7) is also a cross-correlation function of a signal component being null in the right and left directions as represented in Expression (6), the coherence filter coefficient coef(f,K,p) can be associated with the arrival bearing of an input voice such that if the cross-correlation is larger, the signal component is a vocal component coming from the front, whose arrival bearing does not deviate, whereas if the cross-correlation is smaller, the signal component is a component whose arrival bearing deviates in the right or left direction.

In practice, when the coherence value COH(K,p), which is a value obtained by averaging the coherence filter coefficient coef(f,K,p) by all frequency components, was calculated to determine its behavior according to Expressions (6) and (7), it was confirmed that the coherence value COH(K,p) in a noise interval increases as the times of iteration increase, leading to the decrease of contribution of the components arriving from the side.

However, if the iteration is conducted more than necessary, the components arriving from the front are also suppressed, resulting in distortion of sound. In this case, the coherence value COH(K,p) decreases because the influence of the components arriving from the front gets lower.

In view of the above-described behavior of the coherence value COH(K,p) depending on the times of iteration, it is considered that the times of iteration that allow the coherence value COH(K,p) to take a limit value can provide a balance between the suppression capability and the sound quality.

Accordingly, in the second embodiment, the coherence value COH(K,p) is monitored for each iteration, and when the change, namely behavior, in the coherence value COH(K,p) turns from increment to decrement, the iteration is terminated, thereby allowing iterative spectral subtraction to be performed with the optimal times of iteration.

Figure 10:
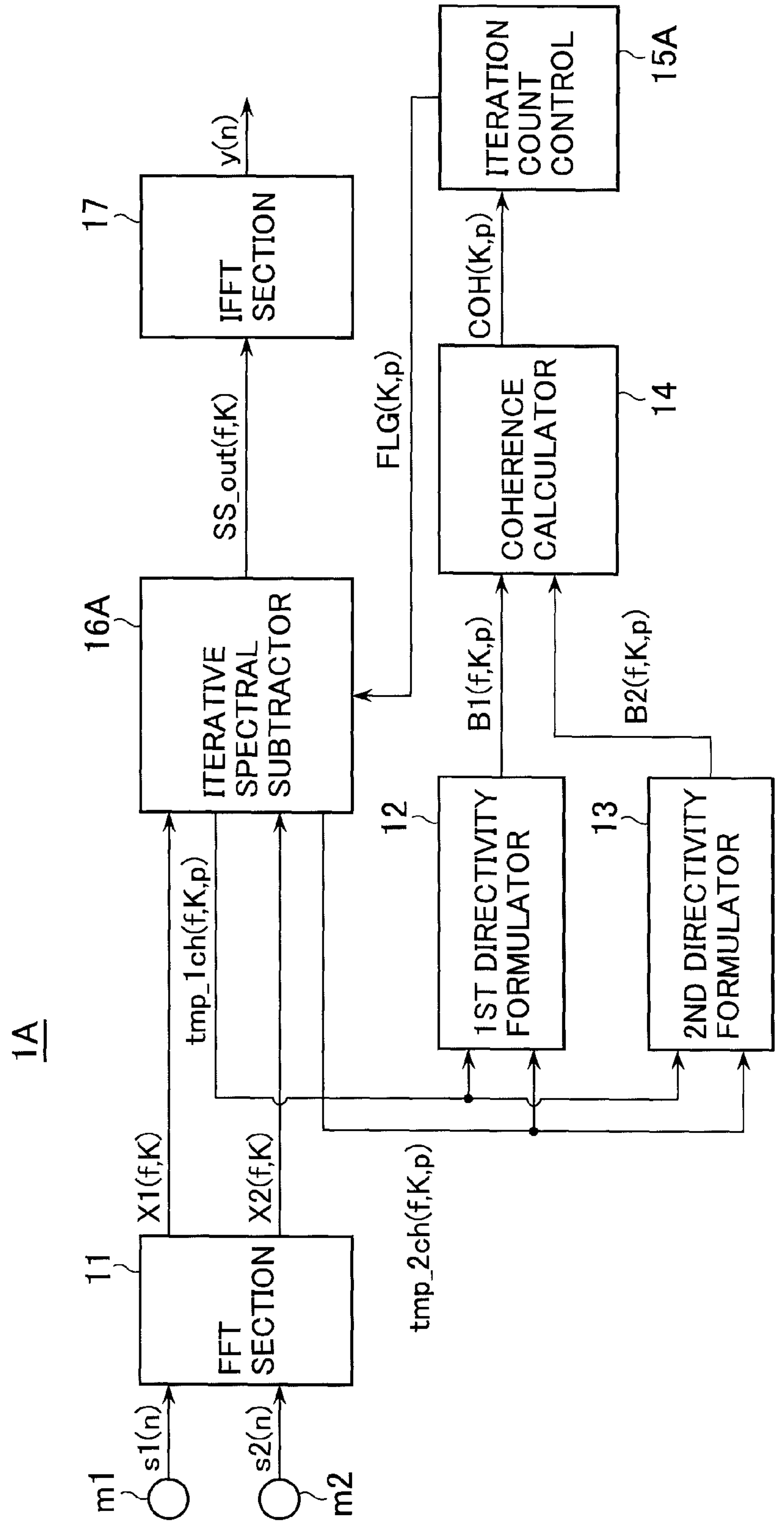
FIG. 10 is a schematic block diagram showing a configuration of a signal processor according to a second embodiment of the present invention.

FIG. 10 shows a configuration of the signal processor according to the second embodiment, in which figure the similar or corresponding parts to those in FIG. 1 according to the first embodiment are assigned with the same reference numerals as FIG. 1.

The signal processor 1A of the second embodiment is different from the first embodiment in that the processor 1A comprises an iteration count control 15A, an iterative spectral subtractor 16A in addition to the pair of microphones m1 and m2, the FFT section 11, the first and second directivity formulators 12 and 13, the coherence calculator 14, and the IFFT section 17.

The iterative spectral subtractor 16A of the second embodiment supplies the first and second directivity formulators 12 and 13 with the signals to be subtracted tmp_1ch(f,K,p) and tmp_2ch(f,K,p), respectively, for each iteration, and receives an iteration termination flag FLG(K,p) the iteration count control 15A outputs in response. Then, if the iteration termination flag FLG(K,p) is OFF, the subtractor 16A iterates the spectral subtraction with the current iteration count p, and if the iteration termination flag FLG(K,p) is ON, then terminates the iterative spectral subtraction without iterating the spectral subtraction with the current iteration count p.

Note that, as described above, in the second embodiment, the first and second directivity formulators 12 and 13 are supplied with the signals to be subtracted tmp_1ch(f,K,p) and tmp_2ch(f,K,p), respectively, and these input signals are subjected to the calculation similar to that employed in the first embodiment, so as to form the directional signals B1(*f*, K,p) and B2(*f*, K,p).

The iteration count control 15A of the second embodiment determines whether or not the coherence value COH(K,p) supplied by the coherence calculator 14 turns from increment to decrement, and supplies the iterative spectral subtractor 16A with the iteration termination flag FLG(K,p) which takes its OFF state when the coherence value does not turn to decrement or its ON state when the coherence value turns to decrement.

Figure 11:
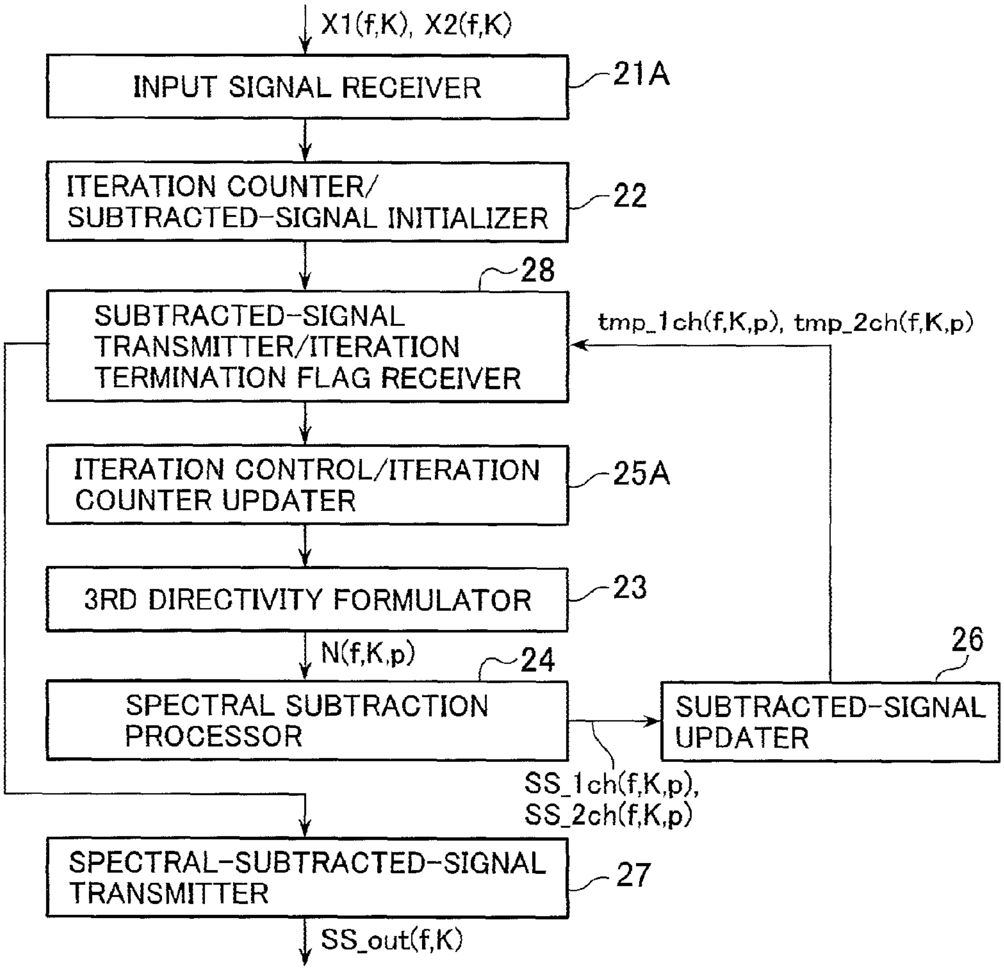
FIG. 11 is a schematic block diagram showing in detail a configuration of an iterative spectral subtractor according to the embodiment shown in FIG. 10.

FIG. 11 shows a specific configuration of the iterative spectral subtractor 16A in accordance with the second embodiment, in which figure the similar or corresponding parts to those in FIG. 5 according to the first embodiment are assigned with the same reference numerals as FIG. 5.

The iterative spectral subtractor 16A comprises an input signal receiver 21A, an iteration control/iteration counter updater 25A and a subtracted-signal transmitter/iteration termination flag receiver 28 as well as the iteration counter/subtracted-signal initializer 22, the third directivity formulator 23, the spectral subtraction processor 24, the subtracted-signal updater 26 and the spectral-subtracted-signal transmitter 27.

The input signal/iteration count receiver 21A receives the frequency domain signals X1(*f*,K) and X2(*f*,K) output from the FFT section 11.

The iteration counter/subtracted-signal initializer 22 may be identical with that in the first embodiment, and thus the description about it will be not be repeated.

The subtracted-signal transmitter/iteration termination flag receiver 28 transmits the signals to be subtracted tmp_1ch(f,K,p) and tmp_2ch(f,K,p) obtained by performing the iteration the currently-defined number of times to the first and second directivity formulators 12 and 13, respectively, and also receives the iteration termination flag FLG (K,p) supplied from the iteration count control 15A.

The iteration control/iteration counter updater 25A determines whether the received iteration termination flag FLG (K,p) is ON or OFF, and controls the components to continue, when the iteration termination flag FLG(K,p) is OFF, the iteration of the spectral subtraction, and to terminate, when the iteration termination flag FLG(K,p) is ON, the iteration of the spectral subtraction. Additionally, when the iteration termination flag FLG(K,p) is OFF, the iteration control/iteration counter updater 25A increments the iteration counter p by one.

The third directivity formulator 23, the spectral subtraction processor 24, the subtracted-signal updater 26 and the spectral-subtracted-signal transmitter 27 may be similar to those in the first embodiments, and therefore the descriptions about them will not be repeated.

Figure 12:
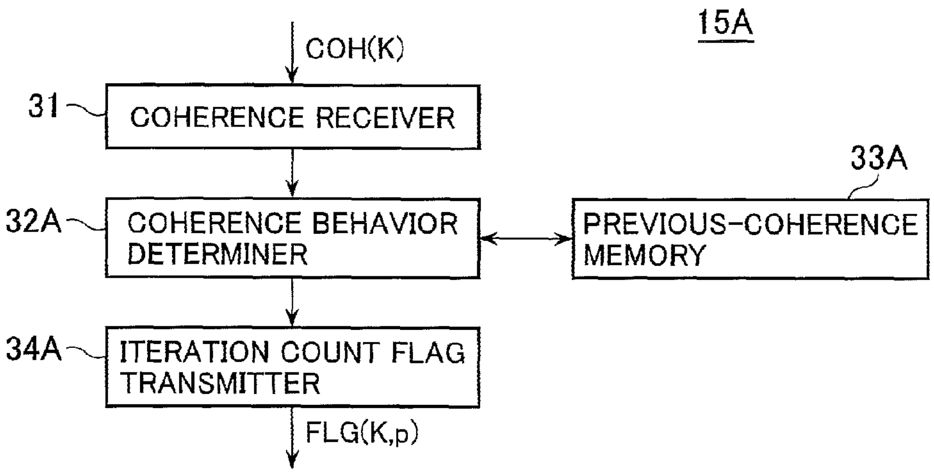
FIG. 12 is a schematic block diagram showing in detail a configuration of an iteration count control according to the second embodiment.

FIG. 12 shows a specific configuration of the iteration count control 15A of the second embodiment. In this figure, the iteration count control 15A comprises a coherence behavior determiner 32A, a previous-coherence memory 33A and an iteration termination flag transmitter 34A as well as the coherence receiver 31.

The coherence receiver 31 retrieves, as is the case with the first embodiment, the coherence value COH(K,p) output from the coherence calculator 14.

The coherence behavior determiner 32A refers to the received coherence value COH(K,p) acquired in the current iteration and a coherence value COH(K,p−1) acquired in a previous iteration stored in the previous-coherence memory 33A for comprehending the behavior of the coherence to thereby produce the iteration termination flag FLG(K,p), and then stores the coherence value COH(K,p) of the current iteration in the previous-coherence memory 33A.

The coherence behavior determiner 32A is adapted for setting the iteration termination flag FLG(K,p) to its OFF state if the coherence value COH(K,p) of the present iteration is greater than the coherence value COH(K,p−1) of the previous iteration, while setting the iteration termination flag FLG(K,p) to its ON state if the present coherence value COH(K,p) does not exceed the previous coherence value COH(K,p−1).

The previous-coherence memory 33A has the coherence value COH(K,p−1) stored which was obtained in the previous iteration.

The iteration termination flag transmitter 34A supplies the iteration termination flag FLG(K,p) of the current iteration produced by the coherence behavior determiner 32A to the iterative spectral subtractor 16A.

Next, with reference to the drawings, a description will be made about the general operation of the signal processor 1A and a specific operation of the iterative spectral subtractor 16A in accordance with the second embodiment.

The signals s1(*n*) and s2(*n*) in the time domain input from the pair of microphones m1 and m2 are converted into the signals X1(*f*,K) and X2(*f*,K) in the frequency domain by the FFT section 11, which are then fed to the iterative spectral subtractor 16A.

The iterative spectral subtractor 16A produces, for each iteration, the signals to be subtracted tmp_1ch(f,K,p) and tmp_2ch(f,K,p) for that iteration, and supplies the signals to be subtracted tmp_1ch(f,K,p) and tmp_2ch(f,K,p) to the corresponding first and second directivity formulators 12 and 13.

On the basis of the signals to be subtracted tmp_1ch(f,K,p) and tmp_2ch(f,K,p), the first and second directivity formulators 12 and 13 form the first and second directional signals B1(*f*,K,p) and B2(*f*,K,p), respectively, which are null in certain respective directions. Subsequently, the coherence calculator 14 applies the first and second directional signals B1(*f*, K,p) and B2(*f*, K,p) to the calculation of the coherence value COH(K,p) by means of Expressions (6) and (7), and the iteration count control 15A in turn uses the calculated coherence value COH(K,p) of the current iteration and the coherence value COH(K,p−1) of the previous iteration stored in the memory to set the iteration termination flag FLG(K,p), which is then supplied to the iterative spectral subtractor 16A.

The iterative spectral subtractor 16A uses the frequency domain signals X1(*f*,K) and X2(*f*,K) as primary subtraction signals to iterate the spectral subtraction a certain number of times until the iteration termination flag FLG(K,p) becomes ON, and supplies the iterative spectral-subtracted signal SS_out(f,K) obtained by the subtraction to the IFFT section 17.

The IFFT section 17 converts the iterative spectral-subtracted signal SS_out(f,K) in the frequency domain into the time domain signal y(n) by the inverse fast Fourier transform to output the signal y(n).

Figure 13:
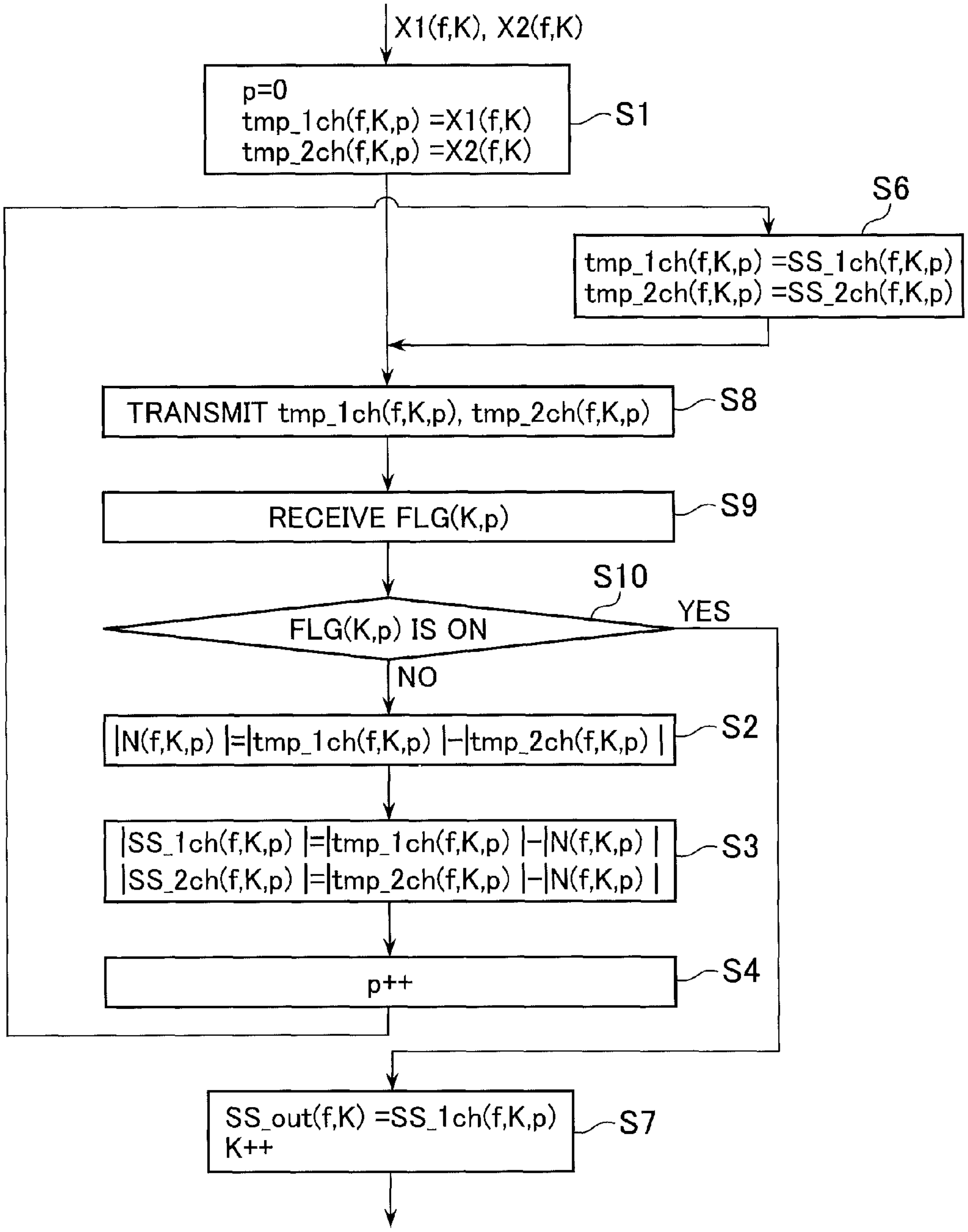
FIG. 13 is a flowchart useful for understanding a specific operation of the iterative spectral subtractor in the second embodiment.

Now, with reference to FIG. 13, the specific operation of the iterative spectral subtractor 16A will be described. FIG. 13 shows the processing conducted on a frame, the operation illustrated in FIG. 13 being repeated frame by frame. In addition, in FIG. 13, the steps identical with those in FIG. 9 according to the first embodiment are designated with the same reference numerals.

When the processing is conducted on a new frame and the frequency domain signals X1(*f*,K) and X2(*f*,K) of the new frame, i.e. current frame K, are supplied from the FFT section 11, the iterative spectral subtractor 16A increments the iteration counter p by one, while initializing the signals to be subtracted tmp_1ch(f,K,p) and tmp_2ch(f,K,p) to the frequency domain signals X1(*f*,K) and X2(*f*,K), respectively (Step S1).

Subsequently, the iterative spectral subtractor 16A sends out the signals to be subtracted tmp_1ch(f,K,p) and tmp_2ch (f,K,p) thus obtained in the current iteration to the first and second directivity formulators 12 and 13, respectively (Step S8), and receives the iteration termination flag FLG(K,p) set and sent back in response thereto (Step S9).

The iterative spectral subtractor 16A in turn makes a determination about whether or not the received iteration termination flag FLG(K,p) is ON (Step S10).

If the received iteration termination flag FLG(K,p) is OFF, the iterative spectral subtractor 16A uses the signals to be subtracted tmp_1ch(f,K,p) and tmp_2ch(f,K,p) obtained in the current iteration to form the noise signal N(f,K,p) by applying Expression (8) (Step S2). In addition, on the basis of the signals to be subtracted tmp_1ch(f,K,p) and tmp_2ch (f,K,p) as well as the noise signal N(f,K,p), the iterative spectral subtractor 16A iteratively performs the spectral subtraction the currently-defined number of times according to Expressions (9) and (10) so as to produce the spectral-subtracted signals SS_1ch(f,K,p) and SS_2ch(f,K,p) (Step S3). Subsequently, the subtractor 16A increments the iteration counter p by one (Step S4), and updates the signals to be subtracted tmp_1ch(f,K,p) and tmp_2ch(f,K,p) respectively with the spectral-subtracted signals SS_1ch(f,K,p) and SS_2ch(f,K,p) obtained by the previous iteration (Step S6). Then, the operation moves to the above-described step S8.

By contrast, if the received iteration termination flag FLG(K,p) is ON, the iterative spectral subtractor 16A supplies the IFFT section 17 with either one of the spectral-subtracted signals SS_1ch(f,K,p−1) and SS_2ch(f,K,p−1) acquired by the previous iteration in the form of iterative spectral-subtracted signal SS_out(f,K), and in turn increments the parameter K defining the frame by one (Step S7) to terminate the current frame processing. Then, another frame processing will be started.

In the second embodiment, the timing to terminate the iteration of the spectral subtraction is understood from the viewpoint of the arrival bearing of the target voice, and the iterative spectral subtraction is performed until the termination timing comes, whereby a good balance can be achieved between the sound quality and the capability of noise suppression.

In this way, the signal processor of the second embodiment can be applied to a telecommunications device, such as a videoconference system, cellular phone, smartphone and similar, to improve the sound quality on a telephone call.

As described so far, the spectral subtraction may not be limited to those described in connection with the above embodiments. In addition to the cases of the above embodiments, there are many known spectral subtraction techniques. For example, the subtraction can be performed after multiplying the noise signal N(f,K,p) by a subtraction coefficient. Alternatively, the iterative spectral-subtracted signal SS_out(f,K) can be subjected to flooring before supplying the signal to the IFFT section 17.

In the first embodiment, the same times of iteration are defined throughout all frequency components by using the coherence value COH(K), but the times of iteration can differ frequency by frequency. In this case, for instance, the coherence value COH(K) may be replaced by a correlation value coef(f) acquirable by Expression (6) for each frequency component to define the times of iteration.

In the first embodiment, the larger the coherence value COH(K), the smaller the times of iteration. By contrast, there may be methods of estimating noise components in spectral subtraction in which the times of iteration may preferably be larger for a larger coherence value COH(K).

Moreover, in the first embodiment, the ranges of the coherence value are made associated with the times of iteration in advance, and an iteration associated with a range where the current coherence value lies is defined as the iteration to be carried out on the iterative spectral subtraction. Alternatively, the relationship between the coherence and the times of iteration may be defined beforehand as a function, which will in turn be calculated with its input of the current coherence value to define the times of iteration to be applied to the iterative spectral subtraction.

In the second embodiment, once the coherence value obtained in the current iteration falls below that in the previous iteration, it is considered that the behavior of the coherence for each iteration turns from increment to decrement. Alternatively, if the coherence value in the current iteration falls below that in the previous iteration a certain number of times, e.g. twice, it can be considered that the behavior of the coherence turns from increment to decrement.

In the second embodiment, the iteration is controlled to strike the balance between the suppression capability and the sound quality. Alternatively, the sound quality can be decreased to place much significance on the suppression capability, or otherwise the suppression capability may be decreased to put emphasis on the sound quality. In the former case, even after the coherence value starts to decrease, for instance, the iteration process will be continued a predefined number of times. In the latter case, for example, the output signal may be a signal obtained by the spectral subtraction conducted in an iteration a predetermined number of times before the iteration in which the behavior of the coherence value turns to decrement.

The first embodiment may also be modified so that the relationship between a range of the coherence values and the times of iteration, which relationship is to be recorded in a transformation table, may be defined such that the sound quality is decreased to place much significance on the suppression capability, or otherwise the suppression capability is decreased to place much significance on the sound quality.

In the second embodiment, the determination on the termination of the iteration is made based on the magnitude of the coherence value in the iterations successively taken place. Alternatively, the determination can be made on the basis of an inclination, i.e. differential coefficient, of the coherence in the iterations successively taken place. If the inclination turns to zero, or within a range of $0\pm\alpha$, where a is a small value sufficient to determine a local maximal value, the termination of the iteration is decided. When a difference in calculation time of the coherence in the iterations successively conducted is constant, the inclination can be obtained as a difference in the coherence in the iterations performed successively. If the difference in calculation time of the coherence in the successive iterations is not constant, the time is recorded for each calculation of the coherence, so as to calculate the inclination by dividing the difference in coherence between the successive iterations by the time difference.

In the second embodiment, the coherence, which is the average of coherence filter coefficients, namely the correlation value coef(f) for each frequency component, is used for making the determination on the iteration termination. Alternatively, any other statistical amounts, such as a median, may be adapted instead of the coherence as long as such statistical amounts are representative of the distribution of the coherence filter coefficients coef(0,K,p) to coef(M−1,K, p) for each frequency component.

The illustrative embodiments use the coherence value COH(K) for determining whether the iteration is to be continued or terminated. Alternatively, the determination on whether the iteration is to be continued or terminated may be made by using, instead of the coherence value COH(K), any of feature quantities implying the feature of "the content of target voice in an input voice signal."

In the above-described embodiments, the processing performed on the frequency domain signals may instead be conducted with time domain signals where feasible.

In the above embodiments, signals picked up by a pair of microphones are immediately processed. However, target voice signals to be processed according to the present invention may not be limited to such signals. For example, the present invention can be applied for processing a pair of voice signals read out from a storage medium. Moreover, the present invention can be applied for processing a pair of voice signals transmitted from other devices connected thereto. In such modifications of the embodiments, incoming signals may already have been transformed into frequency domain signals when the signals are input into the signal processor.

The entire disclosure of Japanese patent application No. 2013-036360 filed on Feb. 26, 2013, including the specification, claims, accompanying drawings and abstract of the disclosure, is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

The invention claimed is:

1. A signal processor comprising an iterative spectral subtractor repeatedly executing spectral subtraction on an input signal containing a noise component so that the spectral subtraction is iterated to suppress the noise component, said processor further comprising:

a coherence calculator calculating coherence from a first directional signal with a directional characteristic being null in a predetermined direction formed from the input signal and a second directional signal with a directional characteristic being null in another predetermined direction formed from the input signal; and an iteration count control controlling, on a basis of the coherence, times of iteration of the spectral subtraction depending on an arrival bearing of the noise component.

2. The signal processor in accordance with claim 1, wherein the input signal contains a pair of input signals, said processor further comprising:

a first directivity formulator using the pair of signals to form the first directional signal; and a second directivity formulator using the pair of signals to form the second directional signal.

3. The signal processor in accordance with claim 1, wherein the input signal contains a pair of voice signals, said iteration count control defining the times of iteration according to the coherence calculated by said coherence calculator and informing said iterative spectral subtractor of the times of iteration.

4. The signal processor in accordance with claim 1, wherein the input signal contains signals to be used for performing the spectral subtraction in another iteration, said iteration count control informing said iterative spectral subtractor of termination of the iteration when the coherence calculated by said coherence calculator turns from increment to decrement.

5. A signal processing method comprising an iterative spectral subtraction step of repeatedly executing spectral subtraction on an input signal containing a noise component so that the spectral subtraction is iterated to suppress the noise component, said method further comprising:

a coherence calculation step of calculating coherence from a first directional signal with a directional characteristic being null in a predetermined direction formed from the input signal and a second directional signal with a directional characteristic being null in another predetermined direction formed from the input signal; and an iteration count control step of controlling, on a basis of the coherence, times of iteration of the spectral subtraction depending on an arrival bearing of the noise component.

6. The signal processing method of claim 5, further comprising:

setting an iteration termination flag to a first state if a coherence value of a present iteration is greater than a coherence value of a previous iteration; and setting the iteration termination flag to a second state if the coherence value of the present iteration is not greater than the coherence value of the previous iteration.

7. A non-transitory computer-readable medium having a signal processing program stored which operates a computer as a signal processor performing iterative spectral subtraction in order to repeatedly perform the spectral subtraction on an input signal containing a noise component to thereby suppress the noise component, wherein said program conducts:

coherence calculation for calculating coherence from a first directional signal with a directional characteristic being null in a predetermined direction formed from the input signal and a second directional signal with a directional characteristic being null in another predetermined direction formed from the input signal; and iteration count control for controlling, on a basis of the coherence, times of iteration of the spectral subtraction depending on an arrival bearing of the noise component.

* * * * *